| United States Patent [19] | [11] Patent Number: 4,738,990 |
| Nelb, II et al. | [45] Date of Patent: Apr. 19, 1988 |

[54] FIRE RESISTANT FOAM COMPOSED OF PREDOMINANTLY AMIDE AND IMIDE LINKAGES

[75] Inventors: Robert G. Nelb, II, Madison; Keith G. Saunders, Cheshire, both of Conn.

[73] Assignee: The Dow Chemical Company, Midland, Mich.

[21] Appl. No.: 91,141

[22] Filed: Aug. 31, 1987

[51] Int. Cl.$^4$ ................................................. C08J 9/00
[52] U.S. Cl. .................................... 521/108; 521/107; 521/168; 521/169; 521/184; 521/185; 521/189
[58] Field of Search ............... 521/107, 108, 168, 169, 521/184, 185, 189

[56] References Cited

U.S. PATENT DOCUMENTS

| Re. 32,255 | 9/1986 | Gagliani et al. | 521/56 |
| Re. 32,256 | 9/1986 | Gagliani et al. | 521/180 |
| 3,300,420 | 1/1967 | Frey | 260/2.5 |
| 3,479,305 | 11/1969 | Kus et al. | 260/2.5 |
| 3,562,189 | 2/1971 | Farrissey et al. | 260/2.5 |
| 4,026,833 | 5/1977 | D'Aello | 260/25 R |
| 4,108,810 | 8/1978 | Baker | 521/129 |
| 4,110,274 | 8/1978 | Corbett et al. | 521/157 |
| 4,153,783 | 5/1979 | Gagliani et al. | 528/337 |
| 4,156,065 | 5/1979 | Onder et al. | 528/84 |
| 4,177,333 | 12/1979 | Riccitiello | 521/124 |
| 4,407,980 | 10/1983 | Gagliani et al. | 521/99 |
| 4,425,441 | 1/1984 | Gagliani et al. | 521/56 |
| 4,426,463 | 1/1984 | Gagliani et al. | 521/180 |
| 4,439,381 | 3/1984 | Gagliani et al. | 264/26 |
| 4,476,254 | 10/1984 | Long et al. | 521/180 |
| 4,506,038 | 3/1985 | Gagliani et al. | 521/103 |
| 4,518,717 | 5/1985 | Long et al. | 521/109.1 |
| 4,539,336 | 9/1985 | Long et al. | 521/77 |
| 4,604,409 | 8/1986 | Gagliani et al. | 521/157 |
| 4,621,015 | 11/1986 | Long et al. | 428/317.7 |

*Primary Examiner*—Morton Foelak
*Attorney, Agent, or Firm*—J. S. Rose

[57] ABSTRACT

Disclosed is a process for the preparation of a polyamideimide semi-flexible foam wherein a foam precursor is first prepared by heating together a mixture of an organic polyisocyanate, an aromatic polycarboxylic compound and a catalyst comprising a cyclic phosphorus compound, optionally in the presence of a surfactant until at least about 45 percent of the theoretical carbon dioxide has been evolved. The solidified precursor is comminuted and then heated to complete the reaction producing polyamideimide foam.

16 Claims, No Drawings

FIRE RESISTANT FOAM COMPOSED OF PREDOMINANTLY AMIDE AND IMIDE LINKAGES

FIELD OF THE INVENTION

This invention relates to cellular polyamideimides and is more particularly concerned with a process for the preparation of semi-flexible polyamideimide foams.

DESCRIPTION OF THE PRIOR ART

Cellular or foamed polyimides and polyamideimides have been known for some time. Initially, such foams were rigid materials which rigidity seriously limited their utility due to their hardness, friability, and the like. One of the earliest disclosures in this area was U.S. Pat. No. 3,300,420 which taught the preparation of either polyimide or polyamideimide foams via the reactions of organic polyisocyanates with aromatic anhydrides having at least one additional isocyanate reactive group. The additional groups included, inter alia, anhydride groups and carboxylic acid groups. The carbon dioxide generated acts as the blowing agent for the polymerizing reaction mixture. Typical catalysts disclosed included tertiary amines, alkali metal salts, and heavy metal salts such as the metal salts of weak acids. All of the foams produced by this method are rigid and difficult to process. U.S. Pat. No. 3,479,305 discloses basically the same rigid foam products as the above patent but prepared through an improved process calling for water as catalyst.

U.S. Pat. No. 3,562,189 disclosed rigid polyimide foams prepared in a one-shot process by admixing at ambient temperatures polycarboxylic derivatives (i.e. acids or anhydrides) with polyisocyanates in the presence of dipolar aprotic solvents.

Rigid polyimide foams are disclosed in U.S. Pat. No. 4,026,833 wherein aromatic polyimides with anhydride and groups are chain-extended by their reaction with aromatic polyisocyanates. The powdered intermediates are heated as a preform or loose powder to form the rigid foam. U.S. Pat. Nos. 4,108,810 and 4,110,274 disclose rigid polyimide foams which are cross-linked based on the reactions of at least one dicarboxylic acid, at least one ethylenically unsaturated dicarboxylic acid anhydride and a polyisocyanate.

U.S. Pat. No. 4,177,333 discloses a class of metallic salts of octoic acid, e.g. stannous octoate in the preparation of polyimide foams from aromatic isocyanates and aromatic dianhydrides. Primarily this teaching is directed to rigid foams, although reference is made to flexible and semi-rigid foams in one example. In the context of this particular example it is not clear whether the products are truly flexible in the strict sense of the meaning known to those skilled in the foam art.

Preparative methods for the formation of polyimide foams based on tetracarboxylic acids or their anhydrides with co-reactants other than the polyisocyanates discussed above are also well known as typically disclosed in U.S. Pat. No. 4,153,783. This method calls for the initial formation of a di-ester by the reaction of a mono-alcohol with the carboxylic component. The di-ester is then reacted with a mixture of at least two diamines fo form a resinoid foam precursor. The latter is then heated in powdered form to complete polymerization to the final foam.

Gagliani et al in a series of U.S. patents including U.S. Pat. Nos. 4,394,464 (as Re 32255 and Re 32256 ); 4,407,980; 4,425,441; 4,426,463; 4,439,381; 4,476,254; 4,506,038; 4,518,717; 4,539,336; and 4,621,015 disclose the formation of flexible polyimide and polyamideimide foams. The process includes first the reaction of a dianhydride with an oxoimine (e.g. caprolactam) to form a monoimide followed by esterification with an alcohol and subsequent reaction with a diamine (e.g. p-phenylene diamine) to form a polyimide forming material which can be a powder. The hardness of the foamed products depends on the temperature/time to which the polyimide forming material is exposed. High temperatures, for example 230° to 315° C. up to one hour results in hard rigid polyimide foams, whereas lower temperatures for lesser periods of time will provide flexible polyamideimide foams.

Gagliani et al. in U.S. Pat. No. 4,604,409 have somewhat simplified their previous methods for flexible polyamideimide foam preparation by replacing the above described esterification and diamine reactions on the monoimide by the latter's reaction with an organic polyisocyanate. That is to say, the imidocarboxylic acid formed first by the reaction of a dianhydride with the caprolactam is reacted directly with a polyisocyanate in the presence of a tertiary amine and water to form the polyamideimide foam in one step.

Onder et al. in U.S. Pat. No. 4,156,065 disclose an improved method for catalyzing amide or imide formation between isocyanates and organic carboxylic acids and anhydrides. This improvement calls for the use of certain cyclic phosphorus compounds as catalysts. While the method is directed primarily to the formation of solid polymers, reference is made to the formation of cellular polymers but provides no detailed teaching in this regard.

In spite of the state of the art as described above, there still remains a need for a simple method for preparing a semi-flexible polyamideimide foam using readily available ingredients such as organic polyisocyanates and organic polycarboxyl containing compounds.

SUMMARY OF THE INVENTION

This invention is directed to a process for the preparation of a polyamideimide semi-flexible foam comprising the steps of:

A. forming a foam precursor by mixing in the absence of water in a heating zone a mixture comprising an organic polyisocyanate, an aromatic polycarboxylic compound, and a catalyst comprising a cyclic phosphorus compound and heating said mixture until at least about 45 percent of the theoretical amount of carbon dioxide has been evolved;

B. comminuting said foam precursor; and

C. heating said comminuted precursor in a separate zone until said polyamideimide foam has formed.

The term "aromatic polycarboxylic compound" means a compound wherein the aromatic nucleus is substituted by two to four carboxylic groups either as the free acid groups or corresponding anhydrides thereof when said acid groups are on adjacent carbon atoms provided the product so formed from reaction with the polyisocyanate will contain both amide and imide linkages; and wherein the aromatic nucleus contains from 6 to 18 carbon atoms and is inclusive of benzene, toluene, xylene, naphthalene, and nucleii having the formula

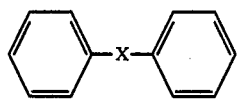

wherein X is selected from the group consisting of —$SO_2$—, —CO—, —O—, lower alkylene from $C_1$ to $C_4$, and a direct linkage. It will be readily apparent to one skilled in the art that all of the carboxylic groups need not be substituted on the same aromatic nucleus and said nucleus can be additionally substituted by other groups so long as the additional groups are not reactive with carboxylic acid groups, anhydride groups, and isocyanate groups.

The term "cyclic phosphorus compound" means the 1-oxide-1-hydrocarbyl, 1-sulfide-1-hydrocarbyl, or 1-hydrocarbylimino-1-hydrocarbyl derivatives of each of the phospholenes (I), phospholanes (II), or phosphetanes (III) disclosed in U.S. Pat. No. 4,156,065 cited supra whose disclosure relative thereto is incorporated herein by reference.

The term "comminuting" means the cutting, chopping, grinding, or pulverizing, and the like so as to reduce the solid substrate to pellets, particles, powder, and the like.

Surprisingly, the polyamideimide foams produced in accordance with the present invention are semi-flexible in spite of the rigid polymer structures involved. This is in complete contrast to the prior art methods particularly as taught by the Frey patent discussed above.

Further, the present method of production is simple without the need for the additional chemical reactions required by the prior art when manufacturing flexible type polyimide and/or polyamideimide foams. The foams in accordance with this invention also enjoy excellent resistance to burning and good physical properties.

DETAILED DESCRIPTION OF THE INVENTION

In carrying out the process of this invention in its broadest scope the organic polyisocyanate, aromatic polycarboxylic compound, and cyclic phosphorus catalyst are heated together, preferably with rapid stirring or agitation until at least about 45 percent of the theoretical amount of carbon dioxide has been evolved to provide a foam precursor material. As taught in the prior art references cited supra, and, well known to those skilled in the art, the theoretical carbon dioxide evolution is readily calculated based on the evolution of one molar equivalent of carbon dioxide gas evolved from the reaction of each equivalent of isocyanate with the equivalent amount of carboxylic acid or anhydride. In the event the carboxylic reactant contains two free ortho substituted carboxylic acid groups rather than the anhydride thereof this must be regarded as one equivalent of anhydride for purposes of gas evolution. This is so because the actual by-products involved are the molar proportions of carbon dioxide and water.

Measurement of the evolved gas is readily accomplished using any conventional means for such determinations. Illustratively, this can include any type of gas flow meter, mass transfer meter, wet test meter, and the like. Alternatively, the gas evolution can be readily determined by trial and error determination of the mass balance of aliquot samples removed during the course of reaction. This data will show the weight loss due to carbon dioxide. A convenient means for performing such mass balance measurements is by thermal gravimetric analysis (TGA) of the aliquot samples. In yet another alternative method, the relationship of reaction time and temperature to the extent of reaction can be determined and thus the measurement of time/temperature itself can be used to follow the course of the reaction. This latter method is particularly convenient for large and continuous preparations in accordance with the present process.

The first stage of producing the foam precursor can be carried out in any convenient apparatus, be it a glass reaction flask, metal reaction kettle, static mixer, or the like provided the apparatus is equipped with an efficient means for mixing relatively viscous materials. Heating of the reactants is required to carry out the process and while the specific temperature employed is not critical, it must be high enough to cause the evolution of the carbon dioxide. Advantageously, they are heated at a temperature of from about 100° C. to about 220° C., and, preferably from about 130° C. to about 180° C.

The quantity of carbon dioxide removed in the making of this foam precursor is not particularly critical from the overall chemical reaction standpoint. However, its criticality does reside in the most expeditious handling of the reaction mass to avoid premature foaming. The viscosity of the reactants increases rapidly as the reaction proceeds making the escape of the gas bubbles more difficult with time. This is why the efficient stirring of the reacting mixture as noted above is quite important. Furthermore, the amount of carbon dioxide left to be expelled in the subsequent treatment of the foam precursor will dictate the final foam densities obtained. Thus the extent of chemical reaction taking place in the formation of the foam precursor takes on significance for reasons other than simply the chemical process per se. Accordingly, at least about 45 percent, preferably from about 45 to about 65 percent of the carbon dioxide should be evolved at this foam precursor stage.

As a further assistance to the carbon dioxide removal, and, to the formation of good cell size and shape in the final foams, it is preferred to use conventional foam surfactants known in the art. This will be discussed in detail hereinbelow. Premature foaming of the reactant mass can be prevented when all of the above factors are carefully controlled.

In the alternative but preferred embodiment of the present process, the formation of the foam precursor is carried out in two separate steps. This greatly reduces the problems of premature foaming. In this preferred method, the heating of the reactants is carried out in the same manner as described above using the same equipment and temperatures in what can be referred to hereinafter as a first heating zone until at least about 15 percent (from about 15 to about 30 percent) of the carbon dioxide has evolved. The addition of the cell modifier or surfactant can be added initially or after reaction has progressed. In the case of non-continuous processes of the invention, it has been found to be most advantageous to add it at that point when from about 10 to about 20 percent of the carbon dioxide has evolved. At this stage the reactant mixture will solidify rapidly if the heating is discontinued. Accordingly, the molten mass before solidification can be manually or mechanically poured, pumped or otherwise transferred to trays or other suitable container to form thin layers of foam precursor intermediates which rapidly solidify to brittle solids. These trays or containers can later serve as the receptacles for subsequent heating in a second zone. Optionally, the solidified precursor intermediate either still in the first zone or transferred to the trays referred to above can thereafter be comminuted by crushing, grinding, milling, ball-milling, and the like. It is preferable that the solid be broken up at least into pieces no larger than ½ inch diameter. In the most preferred embodiment the intermediate is pulverized into a powder form.

Continued reaction of the precursor intermediate to form said foam precursor is carried on by heating it in the second heating zone within the same temperature ranges set forth above for zone one for a time sufficient to evolve the minimum 45 percent carbon dioxide described above in the one-step procedure. This second heating zone can be any means wherein temperatures in excess of about 100° C. are provided. Electrically heated circulating air ovens provide one advantageous source but any other source can be employed. The time for heating the intermediate in this second zone is not the definitive factor but only the volume of gas evolved over the measured time period. In the typical temperature range set forth above (i.e. 130° to 180° C.) one will observe heating times of from about 4 to about 45 minutes. In this connection, one factor determining ease of gas removal, and thus reaction time, is the exposed surface area of the intermediate precursor. Accordingly, this ease can be maximized by disposing the comminuted material in the second heating zone such that it presents its maximum exposed surface area, i.e. spread as thinly as possible whether in chunks or powdered form. This is most readily achieved simply by spreading the intermediate on flat trays.

In a most preferred embodiment of the process the first heating zone wherein the reactants are initially mixed and heated to evolve at least 15 percent gas comprises a melt-extruder apparatus exemplified but not limited to single-screw and twin-screw extruders. It is preferred to add surfactant initially with the reactants to the extruder. The foam precursor intermediate extrudate is a homogeneous foamy yellow strand which is very easily powdered when cool.

While the comminution of the foam precursor intermediate is only optional, although preferred, the foam precursor itself must be comminuted as called for in step (B) above. Any of the comminuting steps discussed above in connection with the intermediate can be employed. Preferably, it is comminuted to a powder, most preferably a powder to pass at least 60 mesh.

The comminuted precursor is then heated in a separate zone until the polyamideimide foam product has formed. Although the term "separate zone" in reference to heating the precursor is meant to distinguish over the heating zone (zones 1 and 2) in respect of the formation of the precursor, this does not imply that it must be a completely different heating source from at least the second heating zone in the two-step process described above. Only the temperature need be different. In this regard, the temperature range employed will be higher in the final foaming step than in the preliminary stages. The particular temperature employed can affect the flexibility of the final foam depending on such factors as time of heating, actual conversion or the amount of carbon dioxide involved, the reactants per se according to isocyanate reactivity, whether it is the carboxylic acid/isocyanate or anhydride/isocyanate reaction and the like. Generally speaking, the foaming temperature will fall within a range of from about 190° C. to about 250° C. and preferably from about 200° C. to about 230° C. The overall time for heating will vary also depending on temperatures employed, depth of the comminuted precursors, and the like. Illustratively, the time for heating can fall within a range of from about 10 to about 60 minutes.

The separate heating zone can be the same heating source employed in the second heating zone above only employed at the higher temperatures. Beside electrical ovens, microwave or radio frequency heating can be employed. The latter methods are preferred for their abilities to impart heat to the central portions of such isulative materials as rising foams.

In one embodiment of the final foaming step, the comminuted (powdered) precursor is placed in the appropriately sized pans in relatively thin powder depths and heated to form the foam using the above conditions. Heat transfer throughout the foaming reaction mixture will become poorer as the foam forms. Accordingly, greater depths of powdered precursor will have more stringent heat transfer problems than thinner depths. Generally speaking, about one inch depth of powder will result in about a five inch depth of foam or a factor of five. This provides the means for determining the depth of foam desired. Advantageously, the depth of powdered precursor employed can fall within a range of a fraction of an inch (i.e. 1/16 inch) to about 5 inches, preferably ¼ inch to about 3 inches.

While the embodiments above describe a static process, it is within the scope of the present invention to carry out the above steps in a continuous manner with the use of conveyor belts carrying the various stages of the reactants through the separate stages of mixing, degassing, comminuting, heating, and the like.

The final foam obtained, if desired or necessary can be cured by further heating at a temperature of from about 190° C. to about 250° C.

Since the foams produced by the present method are intended to be open-celled, in an optional embodiment they can be subjected to conventional crushing procedures well known to those skilled in the art of flexible polyurethane foams for maximizing the open cell content. Various purely mechanical means to reticulate foams include compressing, mangling, wringing, and the like.

The organic polyisocyanates suitable for use in the present process are any of the organic polyisocyanates inclusive of aliphatic, cycloaliphatic, and aromatic polyisocyanates such as disclosed in Liefken, Ann. 562, 122 to 135 (1949) or as typically disclosed in U.S. patents cited as prior art hereinbefore. Because of the lower reactivities of the aliphatic and cycloaliphatic polyisocyanates, they are less preferred than the aromatic based polyisocyanates. Most preferred are the aromatic diisocyanates. The difunctionality is preferred simply because it leads to the production of foams in accordance with the present invention having the greatest amount of flexibility. This is not to say that polyisocyanates of functionality greater than two cannot be used in the method but if they are, it is preferred to employ them in minor proportions (i.e. less than 50 molar percent) with the difunctional isocyanates.

Illustrative of the organic polyisocyanates but not limiting thereof are hexamethylene diisocyanate, isophorone diisocyanate, 4,4'-methylenebis(cyclohexyl isocyanate), p-, and m-xylene diisocyanate, 1,4-diethylbenzene-β,β-diisocyanate, and the like; 2,4-tolylene diisocyanate, 2,6-tolylene diisocyanate, 4,4'-methylenebis(phenyl isocyanate), dianisidine diisocyanate, tolidine diisocyanate, m-xylene diisocyanate, 1,5-naphthalene diisocyanate, and other di- and higher polyisocyanates such as those listed in the Tables of Siefken, supra. Mixtures of two or more of the above isocyanates can be used, such as mixtures of the 2,4- and 2,6-isomers of tolylene diisocyanate, mixtures of the 2,4'- and 4,4'-isomers of methylenebis(phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example there can be used 4,4'-methylenebis(phenyl isocyanate) or an admixture thereof with a minor amount of the 2,4'-isomer, which has been treated to convert a minor proportion, generally less than 15% by weight of the starting material, to an artefact of said starting material. For example, the polyisocyanate component can be methylenebis(phenyl isocyanate) which has been converted to a stable liquid at temperatures of about 15° C. and higher using, for example, the process described in U.S. Pat. Nos. 3,384,653, 3,394,164 and 3,394,165; polymethylene polyphenyl isocyanate mixtures wherein the methylenebis(phenyl isocyanate) content is from about 20 to about 85 percent by weight and the remainder of said mixture comprising polymethylene polyphenyl isocyanates of functionality higher than 2. In accordance with the preferred class of polyisocyanates, the preferred illustrative polyisocyanates set forth above are those which fall into the aromatic diisocyanate category, most preferred are those falling in the methylenebis(phenyl isocyanate) category.

In respect of the aromatic polycarboxylic compounds defined above for use in the present process, it will be readily apparent to one skilled in the art that any polycarboxylic compound that will react with the polyisocyanate to result in recurring linkages of both amide and imide can be employed. This does not mean to say that one sole polycarboxylic compound must satisfy this requirement. A mixture of such polycarboxylic compounds may be employed to result in the polyamideimide foams. That is to say, if one sole polycarboxylic compound is employed, it must be substituted by two free carboxylic acids in the ortho configuration (or anhydride thereof) and one additional carboxylic acid group. Alternatively, mixtures of aromatic dicarboxylic acids with aromatic dianhydrides or the free acids thereof can be employed. Of course, the use of mixtures of all three types of polycarboxylic compounds is contemplated.

It is preferable to use the one sole polycarboxylic compound.

Illustrative but non-limiting of the polycarboxylic compounds are isophthalic acid, terephthalic acid, trimellitic acid and the anhydride thereof, pyromellitic acid and the dianhydride thereof, benzene-1,2,3,4-tetracarboxylic acid and the dianhydride thereof, benzene-1,2,3-tricarboxylic acid and the anhydride thereof, diphenyl-3,3',4,4'-tetracarboxylic acid and the dianhydride thereof, diphenyl-2,2',3,3'-tetracarboxylic acid and the dianhydride thereof, naphthalene-2,3,6,7-tetracarboxylic acid and the dianhydride thereof, naphthalene-1,2,4,5-tetracarboxylic acid and the dianhydride thereof, naphthalene-1,4,5,8-tetracarboxylic acid and the dianhydride thereof, 2,6-dichloronaphthalene-1,4,5,8-tetracarboxylic acid and the dianhydride thereof, 2,7-dichloronaphthalene-1,4,5,8-tetracarboxylic acid and the dianhydride thereof, 2,3,6,7-tetrachloronaphthalene-1,4,5,8-tetracarboxylic acid and the dianhydride thereof, bis(2,3-dicarboxyphenyl)methane and the dianhydride thereof, bis(3,4-dicarboxyphenyl)methane and the dianhydride thereof, 1,1-bis(2,3-dicarboxyphenyl)ethane and the dianhydride thereof, 1,1-bis(3,4-dicarboxyphenyl)ethane and the dianhydride thereof, 2,2-bis(2,3-dicarboxyphenyl)propane and the dianhydride thereof, 2,3-bis(3,4-dicarboxyphenyl)propane an the dianhydride thereof, bis(3,4-dicarboxyphenyl)sulfone and the dianhydride thereof, bis(3,4-dicarboxyphenyl)ether and the dianhydride thereof, benzophenone-3,3',4,4'-tetracarboxylic acid and the dianhydride thereof.

Of those polycarboxylic compounds exemplified above, preferred are benzene-1,2,3-tricarboxylic acid and anhydride thereof; and trimellitic acid and the anhydride thereof with the latter more preferred.

The preferred polycarboxylic compound is difunctional with respect to reactivity with the polyisocyanate with the latter also preferably being difunctional. The matching difunctional reactants ensure optimum linearity of the resulting polyamideimides and thus greater flexibility.

The proportions in which the reactants are brought together in keeping with the matching of difunctional reactivity above can be substantially equivalent. Although minor excesses of one over the other will not detract in any way from the present method. Advantageously, the ratio of isocyanate equivalents to total equivalents of carboxyl reactivity (based on carboxyl plus anhydride groups) will fall in a range of from about 0.90:1.0 to about 1.20:1, preferably from about 0.95:1.0 to about 1.10:1.

The novelty in the present method resides in the combination of the particular processing steps discussed above with the cyclic phosphorus catalysts described by Onder et al cited supra whose disclosure in respect of said catalysts is already incorporated herein. The catalysts are broadly defined above by the five-membered phospholenes (I) and phospholanes (II) and four-membered phosphetanes (III). These heterocyclic phosphorus compounds are fully exemplified in the incorporated Onder et al. reference. The preferred class of catalyst for the present process is that defined by the five-membered phospholenes of structure (I) with the phospholene oxides and sulfides being most preferred. Illustrative but not limiting of the catalysts are 1-methyl-2-phospholene-1-oxide, 1-ethyl-2-phospholene-1-oxide, 1-butyl-2-phospholene-1-oxide, 1,3-dimethyl-2-phospholene-1-oxide, 1-methyl-3-ethyl-2-phospholene-1-oxide, 1-benzyl-3-methyl-2-phospholene-1-oxide, 1-phenyl-2-phospholene-1-oxide, 1-phenyl-3-methyl-2-phospholene-1-oxide, 1-phenyl-2-phospholene-1-sulfide, 1,3-dimethyl-2-phospholene-1-sulfide, and the isomeric 3-phospholenes corresponding to the above-named compounds wherein the double bond is in the 3-position. Preferred in those exemplified above are the phospholene-1-oxides.

The proportions in which the catalyst is employed will vary considerably according to the temperatures employed in any of the heating zones, and, particularly the initial zones during the precursor production. If too high a proportion is employed with temperatures on the high side, then stopping of the reaction at the appropriate gas evolution stage can be difficult if not impossible. The exact proportions to suit the reaction conditions can be readily determined. Advantageously, it is employed in the range of from about 0.05 to about 2.0 weight percent based on the polyisocyanate, preferably from about 0.1 to about 1.0 weight percent.

Although not essential as noted above, it is preferred to employ a foam surfactant in the present process. It can be added together with the other reactants at the time of their first being mixed together and prior to any reaction having occurred. This is particularly appropriate where the process is being carried out in an extruder as noted above. In a static process it is preferred that it be added after the reaction has begun but prior to the evolution of the minimum 45 percent carbon dioxide level. Most preferably, the surfactant is added after the evolution of the first 10 percent of gas as noted above, preferably when 10 to 20 percent of gas has evolved.

The preferred class of surfactants comprise the silicone oils which are block copolymers of a polysiloxane and a polyalkylene oxide. Typical of such copolymers can be found in U.S. Pat. No. Re 25727 and U.S. Pat. No. 3,518,288. Commercially available examples of such surfactants are marketed under various trade names such as Dow Corning 195 or 193, Union Carbide L-5320, L-5410, L-5430, L-530, and the like. Surprisingly, the non-hydrolyzable class of silicone surfactants designed primarily for rigid rather than flexible foams are preferred. Such class includes but is not limited to those surfactants sold by Union Carbide under the trade names of L-5410, L-5420, L-5430, L-5340, and L-5350.

As in most surfactants in cellular foam preparation, the most efficacious concentration will vary from one type of surfactant to another. An optimum concentration for one may be far from the optimum for another. Generally speaking, the optimum concentration can be easily determined and will fall within a range of from about 0.01 to about 2 percent by weight based on total formulation weight, preferably from about 0.10 to about 0.5 percent by weight.

Other optional additives which can be added are those routinely employed in foam forming ingredients and include dyes, pigments, metallic powders, inert fillers, and additional flame retardants such as tris($\beta$-chloroethyl)phosphate, tris($\beta$-chloropropyl)phosphate, tris(2,3-dibromopropyl)phosphate, and the like.

The surprising feature of the present process is the fact that semi-flexible foams rather than rigid foams are obtained. Accordingly, the foams prepared by the present process find particular utility in all purposes where semi-flexible cellular materials are used in cushioning applications which require high resistance to heat and resistance to burning. This includes aircraft seat cushioning, sound proofing insulation in aircraft, shipboard, automotive, and building application; insulation where some vibrational shock must be absorbed in a high heat environment as in the engine compartment of automobiles, trucks, heavy machinery and the like.

The foams produced in accordance with the present invention are characterized by oxygen index values of at least 35 percent when tested in accordance with ASTM D-2863 and open cell contents of at least 90 percent.

The following examples describe the manner and process of making and using the invention and set forth the best mode contemplated by the inventors of carrying out the invention but are not to be construed as limiting.

EXAMPLE 1

A 1 liter resin kettle is equipped with a stainless steel Servodyne stirrer, thermocouple probe and an outlet connected to a wet test meter. The kettle is charged with 52.5 g (0.42 equiv.) of 4,4'-methylenebis(phenyl isocyanate) and the kettle placed in an oil bath regulated at 165° C.±2° C. The diisocyanate is stirred until its temperature registers 155° C. At this temperature 38.4 g (0.4 equiv.) of trimellitic anhydride and 0.11 g of 1,3-dimethyl-2-phospholene-1-oxide (DMPO) is added to the kettle. An immediate evolution of carbon dioxide occurs. After about 40 percent of the theoretical carbon dioxide volume is evolved (total theoretical is 9.4 liters) as measured by the wet test meter, 4 drops of a foam surfactant (L-5430 supplied by Union Carbide) are added. Rapid stirring of the reactants prevents their excessive foaming. When about 55 to 65 percent of the theoretical carbon dioxide is evolved, the kettle is quickly removed from the oil bath and the yellow foamy material is transferred to a tray where it is cooled. In about 10 minutes the thin layer of resin (about 1 inch thick) which has solidified is ground to a powder using a mortar and pestle.

The powdered foam precursor is spread evenly on a metal tray lined with aluminum foil to facilitate removal of the foamed product. The depth of the powder is about 0.5 inch. The tray is transferred to a circulating air oven at a temperature of about 225° C. Foaming of the precursor is complete in about five minutes with the height of the foamed sample being about 2.5 to 3.6 inches.

Thus there is produced a fine-celled yellow colored semi-flexible polyamideimide foam in accordance with this invention. Its infrared spectrum is determined by either grinding the foam into a KBr disc for conventional IR or by using an attenuated total reflectance (ATR) crystal in conjunction with FTIR and shows the characteristic absorptions at 1720 cm$^{-1}$ and 1780 cm$^{-1}$ for the imide functional group and an absorption at 1660 cm$^{-1}$ for the amide functional group.

EXAMPLE 2

A 2 liter resin kettle equipped as in Example 1 is charged with 265 g (2.12 equiv.) of 4,4'-methylenebis(phenyl isocyanate) and 192 g (2.0 equiv.) of trimellitic anhydride and immersed in the hot oil bath at 150° C. When the internal temperature of the stirred reactants reaches about 90° C., 0.7 g of the DMPO catalyst is added dropwise during rapid stirring. After about 17 percent of the theoretical carbon dioxide is evolved, 0.7 g of the surfactant L-5430 is added. At this stage a very high rate of stirring (500 r.p.m.) is employed to assist in carbon dioxide evolution without foaming. When the 20 percent level of carbon dioxide evolution is determined (after about 13 to 14 minutes) the yellow foamy resin is poured onto an aluminum foil lined tray and allowed to solidify to a foam precursor intermediate as a brittle yellow solid.

The precursor intermediate is broken into pea-size pieces and left on the tray which is placed in an oven. Tests on aliquot samples show that heating at 160° C. for about 20 minutes results in 65 percent gas loss. Accordingly, the intermediate is heated under these conditions. Thus there is formed a solid yellow foam precursor which is pulverized to a powder using a mortar and pestle.

The powdered foam precursor is placed to a depth of 0.75 inch in a preheated 4"×8"×12" aluminum box lined with aluminum foil and heated at 225° C. for about 30 minutes in the oven. A 4 to 5 inch thick bun of semi-flexible polyamideimide foam is formed in accordance with the present process. Samples of the semi-flexible foam product both in the as-made state, and crushed to 50 percent of their original height for about 10 seconds then released, are characterized by the following physical properties.

|  | As Made | Crushed | Comparison Polyimide Foam |
|---|---|---|---|
| Density (lb/ft$^3$) | 1.2 | 1.2 | 0.8 |
| Open Cell Content (%) | 94 | 98 | 98 |
| Ball Rebound %[1] | 50 | 35 | 50 |
| Tensile strength psi | — | 32 | 15 |
| Compression Set, 75%[2] | — | 38 | 15 to 30 |
| Oxygen Index[3] | 38 | 36 | 38 |
| Smoke Density[4] | 11 | 12 | 5 to 10 |
| Smith Test Data[5] | | | |
| Maximum rate of heat release (BTU/ft$^2$, minute) | 38 | 96 | — |
| Maximum rate of smoke (particles/ft$^2$, minute) | 1050 | 1110 | — |
| % Wt. Loss | 0.8 | 0.6 | — |

Footnotes:
[1] Ball Rebound % is a test for flexible cellular materials in accordance with ASTM D3574 wherein a steel ball is dropped onto the sample in a tube and the height of rebound measured as percent is recorded.
[2] Compression set, 75% is the test for flexible cellular materials in accordance with ASTM Test Method D-3574 wherein the sample is compressed to 75% of its original thickness and the permanent compression of the foam sample in percent is determined after the compressing force is removed.
[3] Oxygen Index in a flammability test in accordance with the ASTM D-2863 procedure and reported as the percent oxygen content required to sustain sample combustion.
[4] Smoke density is the measure of smoke evolved from a burning sample as measured in accordance with ASTM E 662-79 by specific optical density and recorded as dimensionless units wherein the lower the number the better.
[5] Smith Test Data refers to the measurement of the rate of heat and smoke release from a burning sample of material measuring 9⅛ inches square by 2 inches thick in a test chamber along with the cumulated heat and smoke release over a standard period of 3 minutes and the percent weight loss of the sample from combustion and swell of the char as a percentage of the total sample volume, said measurements being carried out in accordance with the method and apparatus described by E. E. Smith Journal of Fire Technology (3), page 157; 1973.

The fire retardant and smoke density properties of the sample are excellent and the foam is predominantly open-cell. A comparison polyimide foam made in accordance with U.S. Pat. No. 4,153,783 is prepared and characterized by the properties set forth in the table under Comparison Polyimide Foam. The polyamideimide foams in accordance with the invention are quite comparable in properties to the prior art polyimide.

EXAMPLE 3

The following experiment describes the preparation of a polyamideimide foam in accordance with the present invention using the same ingredients in the same proportions by weight set forth in Example 2 above and using the same general procedures of first forming the foam precursor intermediate which is then converted to the foam precursor followed by its conversion to the foam as described in Example 2 above. Only this time the molten 4,4'-methylenebis(phenyl isocyanate) and trimellitic anhydride are slurried together to form a thick paste to which the surfactant and catalyst are added. The mixture is then fed into a Brabender single screw extruder fitted with a screw with a 3:1 compression ratio. The heating zones are 160°, 165°, 160°, and 150° C. The throughput (screw speed 30 r.p.m.) was adjusted so that about 20 percent carbon dioxide is evolved. These zone temperatures and screw speed are known to give rise to this gas evolution. The extrudate is a homogeneous foamy yellow strand which quickly rigidifies and is easily powdered when cool forming the powdered foam precursor intermediate.

The intermediate powder was spread on a tray and heated in the air circulating oven at 150° C. for 20 to 25 minutes whereby about 60 percent of the carbon dioxide is evolved to form the foam-precursor. The fused precursor material is ground to a powder and placed in the 4"×8"×12" aluminum box described above to a depth of about 0.5 inch and heated at 225° C. for about 30 minutes. A 3 inch thick bun of semi-flexible polyamideimide foam is formed in accordance with the present process. It is characterized by essentially identical density, open cell content, ball rebound, and oxygen index as in Example 2. Smith test data was not determined. The infrared absorptions are identical to those shown in Example 1.

We claim:

1. A process for the preparation of a polyamideimide semi-flexible foam comprising the steps of:
    A. forming a foam precursor by mixing in the absence of water in a heating zone a mixture comprising an organic polyisocyanate, an aromatic polycarboxylic compound, and a catalyst comprising a cyclic phosphorus compound and heating said mixture until at least about 45 percent of the theoretical amount of carbon dioxide has been evolved;
    B. comminuting said foam precursor; and
    C. heating said comminuted precursor in a separate zone until said polyamideimide foam has formed.

2. A process according to claim 1 wherein step (A) is carried out at a temperature of from about 130° C. to about 180° C.

3. A process according to claim 1 wherein step (A) is carried out in two heating zones such that the reaction ingredients are mixed in a first heating zone until at least about 15 percent of the carbon dioxide has evolved and the precursor intermediate therefrom, optionally in comminuted form, is transferred to a second heating zone and heated until said at least about 45 percent carbon dioxide has evolved to form said foam precursor.

4. A process according to claim 3 wherein said first heating zone comprises a melt-extruder.

5. A process according to claim 3 wherein said optionally comminuted precursor intermediate is disposed in said second heating zone such that its exposed surface area is maximized.

6. A process according to claim 1 wherein said step (B) comprises comminuting said precursor to a powder.

7. A process according to claim 1 wherein said heating step (C) is carried out at a temperature of from about 190° C. to about 250° C.

8. A process according to claim 1 wherein said polyisocyanate is an aromatic diisocyanate.

9. A process according to claim 8 wherein said diisocyanate is methylenebis(phenyl isocyanate).

10. A process according to claim 1 wherein said aromatic polycarboxylic compound is an organic dicarboxylic acid anhydride which also contains a free carboxylic acid group.

11. A process according to claim 10 wherein said compound is trimellitic anhydride.

12. A process according to claim 1 wherein said polyisocyanate and polycarboxylic compound are present in substantially equivalent proportions.

13. A process according to claim 1 wherein said catalyst is a phospholene-1-oxide.

14. A process according to claim 1 wherein a foam surfactant is employed.

15. A process for the preparation of a polyamideimide semi-flexible foam comprising the steps of:
  A. forming a foam precursor by,
    1. mixing in the absence of water in a first heating zone comprising a melt-extruder at a temperature of from about 130° C. to about 180° C. a mixture comprising methylenebis(phenyl isocyanate) and trimellitic anhydride in substantially equivalent proportions, a phospholene-1-oxide catalyst and a surfactant until at least about 15 percent of the theoretical amount of carbon dioxide has been evolved;
    2. transferring the extrudate precursor intermediate from (1), optionally in comminuted form, to a second heating zone wherein it is disposed such that its exposed surface area is maximized and heating said precursor intermediate at a temperature falling within the range set forth above in (1) until at least about 45 percent of the carbon dioxide has evolved to form said foam precursor;
  B. comminuting said foam precursor to a powder; and
  C. heating said powdered foam precursor in a separate zone at a temperature of from about 190° C. to about 250° C. until said polyamideimide foam has formed.

16. A process according to claim 15 additionally comprising a crushing step (D) whereby the open-cell content of said polyamideimide foam is maximized.

* * * * *